(12) United States Patent
Thorsander et al.

(10) Patent No.: US 6,421,628 B1
(45) Date of Patent: Jul. 16, 2002

(54) SIGNAL HANDLING DEVICE

(75) Inventors: Ulf Thorsander, Nykvarn (SE); Peter Fuchs, Palling (DE)

(73) Assignee: Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/364,448

(22) Filed: Jul. 30, 1999

(30) Foreign Application Priority Data

Mar. 8, 1999 (SE) .............................................. 9900820

(51) Int. Cl.$^7$ ............................................. G01C 17/00
(52) U.S. Cl. .................. 702/150; 340/450; 342/357.08; 342/388; 342/458; 342/464; 701/120; 701/220; 702/183
(58) Field of Search .......................... 340/3.1, 35, 35.1, 340/35.2, 35.4, 686.1, 686.3, 825.49; 700/3; 309/9.1; 709/201; 702/188, 150

(56) References Cited

U.S. PATENT DOCUMENTS

| | | | | |
|---|---|---|---|---|
| 3,747,106 A | * | 7/1973 | Dalabakis et al. | 342/458 |
| 4,054,880 A | * | 10/1977 | Dalabakis et al. | 342/464 |
| 4,396,918 A | * | 8/1983 | Wallis | 342/388 |
| 5,049,872 A | | 9/1991 | Yamanaka et al. | 340/450 |
| 5,365,516 A | * | 11/1994 | Jandrell | 370/335 |
| 5,640,325 A | * | 6/1997 | Bandrook et al. | 701/220 |
| 5,677,841 A | * | 10/1997 | Shiomi et al. | 701/120 |
| 5,687,103 A | | 11/1997 | Hagl et al. | 702/150 |
| 5,689,269 A | * | 11/1997 | Norris | 342/357.08 |
| 6,108,616 A | * | 8/2000 | Borchers et al. | 702/183 |

FOREIGN PATENT DOCUMENTS

EP 171 579 2/1986

* cited by examiner

Primary Examiner—John S. Hilten
Assistant Examiner—John Le
(74) Attorney, Agent, or Firm—Kenyon & Kenyon (57) ABSTRACT

A signal handling device enables a data transmission between a plurality of position measuring devices and a master unit. The signal handling device includes a main communications port for communicating with a master unit via a data bus and a measurement port for communicating with a position measuring device. The signal handling device also includes an extension port for connection to an intelligent slave unit so as to enable communication with a plurality of position measuring devices via the said slave unit. In addition, the signal handling device also includes a data processing unit which is capable of managing data traffic between the main communications port, the measurement port and the extension port.

12 Claims, 9 Drawing Sheets

FIG. 2 The Master

FIG.3  Main Module

Position Measurement Device  FIG. 4

Slave Unit  FIG. 5

SIGNAL HANDLING DEVICE

FIELD OF THE INVENTION

The present invention relates to a signal handling device for enabling data transmission between a plurality of position measuring devices and a master unit. The present invention also relates to an intelligent slave unit for co-operation with the signal handling device, and to a position monitoring system including a signal handling device, an intelligent slave unit and a plurality of position measuring devices. The present invention further relates to a method for enabling data transmission between a plurality of position measuring devices and a master unit, and to a computer program for performing the method.

BACKGROUND INFORMATION

In many industrial applications there is a need to monitor the movement of a plurality of movable parts. Such monitoring requires the delivery of a number of position signals to a master unit. The master unit may operate to control actuators causing the movement.

The position signals are generated by position measuring devices, i.e. devices for generating a signal indicative of a position. Optoelectrical position measuring devices include an encoding disc that has an optically readable pattern. The disc pattern is read by one or more detectors which each deliver an electric signal in relation to the amount of light that is received in the detector, so that movement of the encoding disc in relation to the detector will be indicated by changes in the electric signal.

The encoding disc includes a periodic pattern, such as a plurality of light and dark fields of mutually the same size, for instance. When the encoding disc is turned or rotated, the change between dark and light fields can be detected and a change in angle thus determined. Some position measurement devices provide a position signal comprising a plurality of pulse signals, where the state of the pulse signals at an instant of time defines the absolute position of the encoding disc in relation to the detector. These position measuring devices are also referred to as absolute encoders.

U.S. Pat. No. 5,687,103 describes a position measuring device having a memory in which specific parameters of the position measuring device are kept. These parameters can be sent on a data line to a processing unit.

SUMMARY OF THE INVENTION

The present invention addresses the problem of improving performance of a position monitoring system, or a control system, using a plurality of position measuring devices, and reducing the costs for such a system.

According to an exemplary embodiment of the present invention this problem is addressed by a signal handling device for enabling data transmission between a plurality of position measuring devices and a master unit. The signal handling device includes a main communications port for communicating with a master unit via a data bus; a measurement port for communicating with a position measuring device; an extension port for connection to an intelligent slave unit so as to enable communication with a plurality of position measuring devices via the said slave unit; and an intelligent data processing unit capable of managing data traffic between the main communications port, the measurement port and the extension port.

This solution provides the advantage that a plurality of position measuring devices can be connected to the data bus via a single main communications port. Thereby the master is enabled to communicate with a plurality of position measuring devices using a single address on the data bus, an advantageous feature which reduces the number of position request messages the master has to send for receiving position values from a plurality of position measurement devices. Hence, it is possible to increase the transmission capacity of the bus, in terms of number of transmitted position values, since a plurality of position values can be requested in a single message, and likewise a single response on the bus can include plural position values.

The above mentioned problem is also addressed by an intelligent slave unit for enabling data transmission between a plurality of position measuring devices and a signal handling device of the type described above. The slave unit includes a slave communications port suitable for coupling to an extension port of a signal handling device; a measurement port for communicating with a position measuring device; an extension port for connection to an additional intelligent slave unit so as to enable communication with additional position measuring devices via the additional intelligent slave unit; and a slave data processing unit capable of managing data traffic between the slave communications port, the measurement port and the extension port.

Since each slave unit is provided with an extension port to which another slave unit is easily connectable this solution provides a very high versatility. Additionally this solution makes it possible for the main module to order all slave units to take a measurement sample virtually simultaneously, and to thereafter process the measurement values in parallel.

The above mentioned problem is also addressed by a method for enabling data transmission between a plurality of position measuring devices and a master unit using a signal handling device having a communication port. The method comprises the steps of:

communicating with a master unit via a data bus coupled to the communications port;

communicating with a position measuring device via a measurement port;

enabling communication with a plurality of additional position measuring devices via an extension port; and managing data traffic between the communications port, the measurement port and the extension port such that a plurality of position values can be communicated via the data bus in a single message.

The above mentioned problem is also addressed by a computer program product, loadable into a digital memory of a signal handling device; comprising software code portions for performing the above mentioned method when said program is run on a data processing unit of a signal handling device. The term "run on a data processing unit" means that the computer program plus the data processing unit carries out a method which may be of the kind described above. The term "loaded into a digital memory of a signal handling device" means that the signal handling device programmed in this way is capable or adapted to carrying out a method which may be of the kind described above.

The above mentioned problem is also addressed by a computer program product loadable medium, for use with a slave unit.

An aspect of the present invention relates to the problem of reducing the set-up time required by an operator when installing or upgrading a position monitoring system, or a control system, using a plurality of position measuring devices. More specifically this aspect of the present invention relates to the problem of reducing the set-up time required by an operator when adding a position measuring device to a position monitoring system.

The present invention also addresses the problem of eliminating erroneous set-up of a position monitoring system using a plurality of position measuring devices.

The present invention also addresses the problem of facilitating the maintenance of control systems that include movement or position determining encoders.

The present invention furthermore addresses the problem of reducing the cost for installing or upgrading a position monitoring system, or a control system. This problem is addressed by a signal handling device as defined above, wherein the first extension port of the signal handling device has a pre-assembled connector for enabling a releasable plug-in connection of a slave unit thereto. The slave unit also has an extension port which is also provided with a pre-assembled connector of the same physical constitution.

This solution enables an operator to achieve the set-up in a less complex manner since an additional position measuring device is added by the simple measure of plugging a pre-assembled connector, attached to a slave unit/position measuring device, into a corresponding mating connector of an available extension port.

These problems are also addressed by a computer program product which includes a computer readable arrangement causing a signal handling device to cooperate with any connected slave unit so that a newly connected slave unit is automatically provided with an address to which it should respond.

These problems are also addressed by a computer program product which includes a computer readable arrangement causing a data processing unit to transmit a parameter information request to a connected slave unit for obtaining information about any connected measuring device and a computer readable program arrangement causing a data processing unit to receive such parameter information from a connected slave unit, and forward it to the communications port for delivery to a master. The forwarding of the parameter information to the communications port advantageously simplifies the set-up procedure performed by an operator since it enables the operator to verify the correctness of the set-up in a very quick and efficient manner. The operator may, for example, compare the parameter information thus presented on the masters display with the parameter information, such as serial number and model type, written on the outside of the connected measurement device. In this manner, the operator can easily verify that the set-up is correct and a newly added measurement device complies with the specifications of the position monitoring system, or a control system.

DETAILED DESCRIPTION

Figure 1:
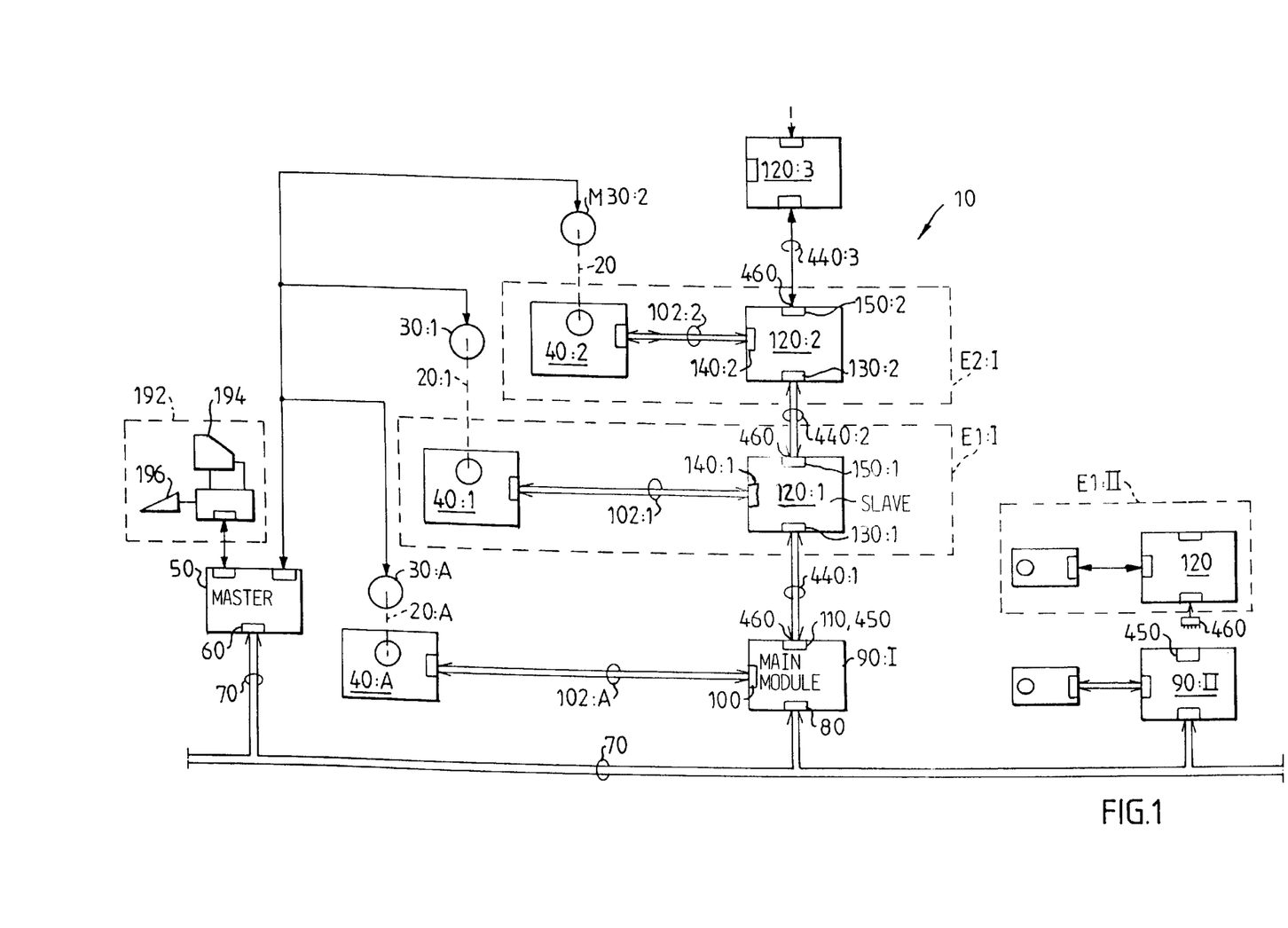
FIG. 1 shows a block diagram of an arrangement having movable parts and a system including a master unit for controlling the movement of these movable parts.

FIG. 1 is a block diagram of an arrangement 10 having movable parts 20 and a system for controlling the movement of these movable parts. The arrangement includes a plurality of controllable actuators 30 for causing the movement of the movable parts. The actuators may be motors and the movable parts may be rotatable axes, according to an embodiment of the present invention.

The movable parts 20 co-operate with measuring devices 40 generating signals indicative of the movement or the position.

A master unit 50 is coupled to the measuring devices for receiving the measurement signals. The master unit 50 is also coupled to the actuators 30 for providing control signals so as to control the movement of the movable parts 20 in dependence on the measurement signals.

With reference to FIG. 1, the master unit 50 is coupled to the measuring devices in the following manner. The master unit 50 has a port 60 to which port a data bus 70 is connected. The data bus 70 is also connectable to a main communications port 80 of a first gateway main module 90:I. A plurality of gateway main modules 90 may be connected to the bus 70, each gateway main module 90 having an individual address. FIG. 1 shows, for the purpose of illustration, only a first gateway main module 90:I and a second gateway main module 90:II. The second gateway main module 90:II functions like the first gateway main module 90:I, but it has a different address to which it responds on calls from the master unit 50. According to an embodiment of the present invention the data bus 70 is a serial data bus adapted for time-critical communication between automation systems, such as master unit 50, and a plurality distributed peripherals, such as main modules 90:I and 90:II. According to a preferred embodiment the data bus 70 is of the type known as PROFIBUS-DP (PROcess Field Data Bus—Decentralised Periphery), which is a serial data bus which supports data exchange between position measuring devices and a master unit.

The main module 90:I has a measurement port 100 for communicating with a measuring device 40:A via a data bus 102:A, and an extension port 110 for communicating with a slave unit 120:1. The main module 90:I operates to communicate with the master 50, via port 80, in accordance with a first communications protocol, and to communicate with one measurement device 40:A, via measurement port 100, in accordance with a second communications protocol.

The main module is also capable of communicating with a plurality of measurement devices 40:1, 40:2 . . . 40:n, via extension port 110 using a third communications protocol.

The first, second and third communications protocols are mutually different, and the main module 90 operates to enable bidirectional exchange of data between the master 50 coupled to the main port 80 and each of the plurality of position measurement devices coupled to the ports 100, 110.

The slave unit 120:1 has a communications port 130:1 for connection to the extension port 110 of the main module 90:I, a measurement port 140:1 for communicating with a measuring device 40:1 via a data bus 102:1 and an extension port 150:1 for communicating with another slave unit 120:2.

The slave unit 120:2 has the same physical structure as slave unit 120:1, and is hence connected to a measuring device 40:2 through a measurement port 140:2. The control system may be further extended by connecting an additional slave unit 120:n+1 with a corresponding measuring devices 40:n+I in the same manner to the extension port 150 of slave unit 120:n, where n is a positive integer. Although FIG. 1 illustrates an embodiment with three slave units 120:1, 120:2, 120:3 it readily understood that the present invention is not limited to this number of slave units. According to one embodiment there are seven slave units connected in this manner to one main module. Thus, according to that embodiment a single main module 90 provides connection to eight position measurement devices 40.

The slave unit 120:1 and the measuring device 40:1, in combination, constitute an extension entity E1:I. Likewise slave unit 120:2 in combination with measuring device 40:2 constitute an extension entity E2:I.

The Master Unit

Figure 2:
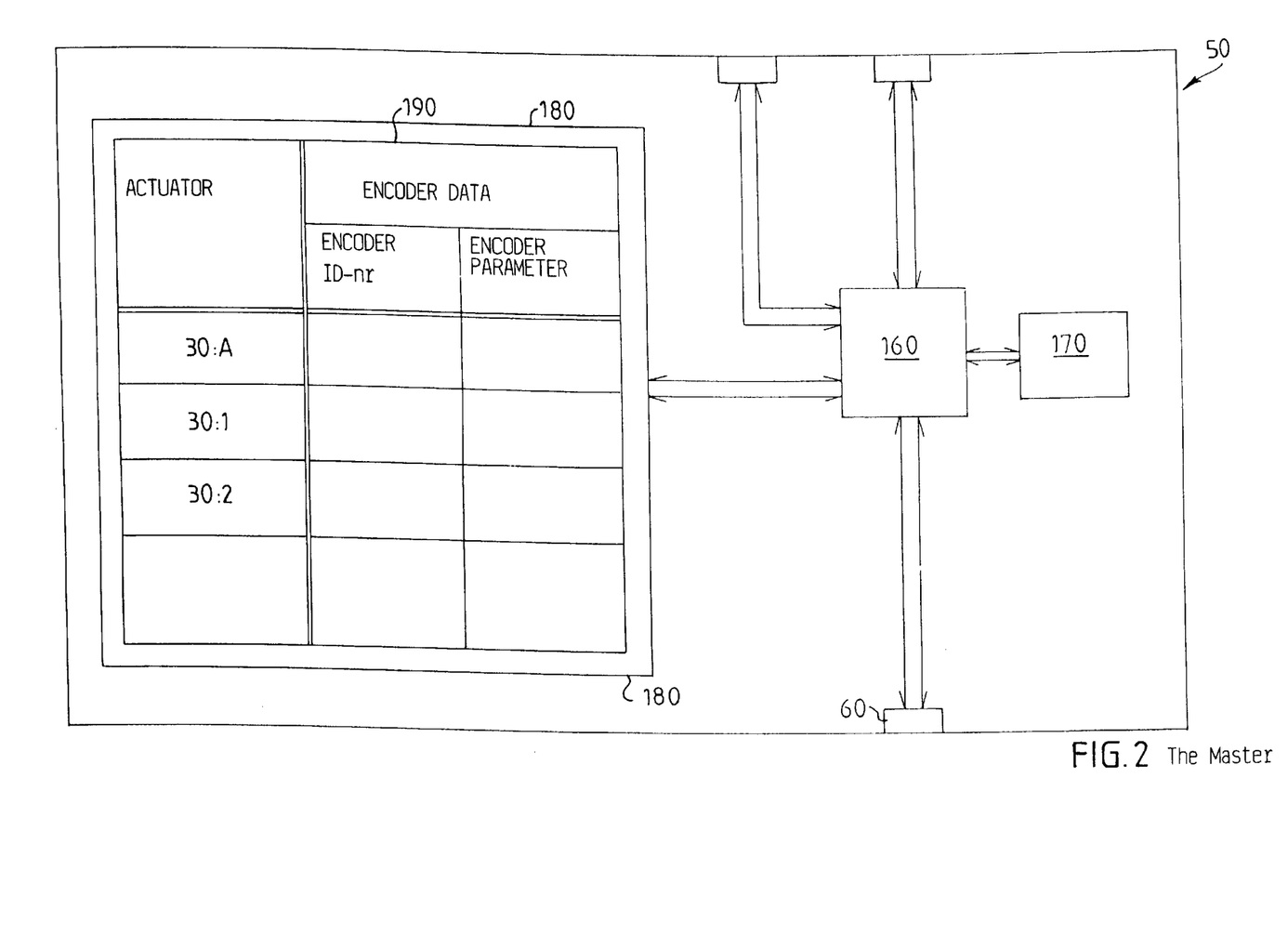
FIG. 2 shows a block diagram of the master unit shown in FIG. 1.

With reference to FIG. 2. the master unit 50 includes a computer processor 160 operating in accordance with a program routine which is stored in a memory 170. The master unit 50 also includes a memory 180 comprising a database 190 with information relevant to the control system. The database includes a list of concordance between individual actuators 30:A, 30:1, 30:2 to be controlled and data relating to the corresponding measuring devices 40:A, 40:1, 40:2 (See FIG. 1).

The data in the database 190 includes an identity field for each measuring device and at least one encoder parameter.

With reference to FIG. 1, the master 50 is coupled to a user interface 192 for enabling an operator to view the contents of the database 190, and to enable manual input of set-up information. For this purpose the user interface includes a display 194 and a data input device 196. After execution of the automatic set-up procedure described with reference to FIG. 7 below, the operator may, from the user interface of the master 50, request all the attached position measurement devices 40 to send identification, such as a serial number, which electronically readable from a memory portion 310 in the position measurement devices. According to one embodiment of the present invention the main module will deliver the identity data for the position measurement devices 40 in a sorted order. The ID data will be sorted in accordance with the order in which the corresponding slave units were attached to the main module. Since the serial number of the encoder is readable both electronically from the memory portion 310 and optically from a tag 330 the operator is advantageously able to verify the correctness of the set-up by comparing the ID data.

The Main Module

Figure 3:
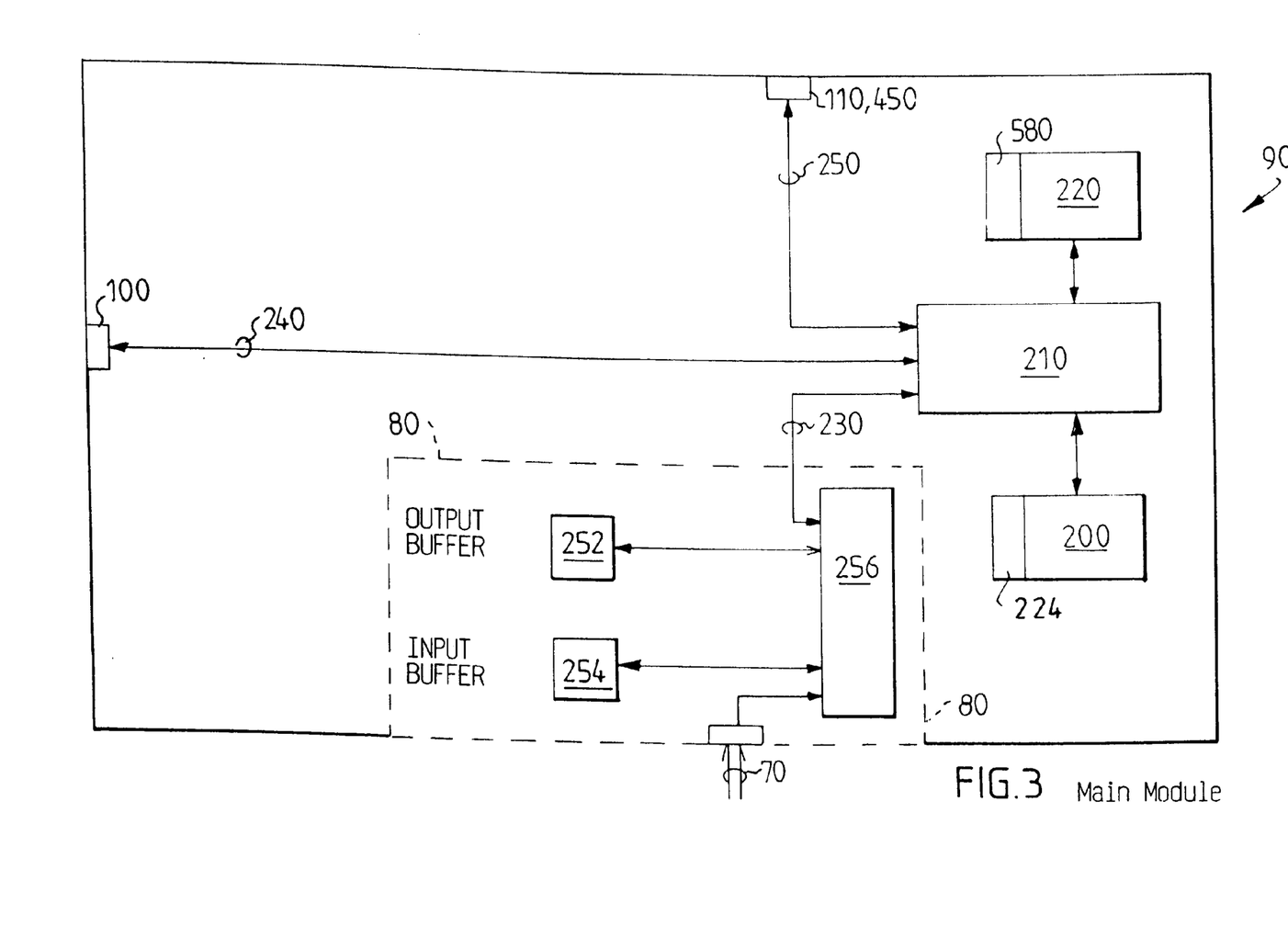
FIG. 3 shows a block diagram of a main module for communicating with the master unit according to FIG. 2. The main module has an extension port for enabling communication with a plurality of position measurement devices.

FIG. 3 is a block diagram of a main module 90. The main module comprises a non-volatile memory 200, a microprocessor 210 and a read/write memory 220. The non-volatile memory 200 has a first memory portion 230 wherein a computer program is stored for controlling the functions of the main module 90. The processor 210 is coupled to the ports 80, 100 and 110, respectively, via buses 230, 240 and 250 respectively.

The port 80 is an intelligent communications port which is capable of receiving data from the data bus 230 and storing the received data in a first buffer memory 252. The port 80 also includes a second buffer memory 254 for temporary storage of data received from the bus 70. A transceiver unit 256 handles the data traffic between the buses 230 and 70, and this data traffic procedure may include temporary storage in one of the buffer memories 252,254.

The measurement port 100 of the main module 90 is adapted for serial data transmission with a position measurement device 40. The port 100, according to an embodiment of the invention, provides physical connection to conductors in the bus 102. The conductors in the bus 102 includes a data line on which serial data is transmitted bi-directionally between the main module 90 and the position measurement device 40. This communication is described in further detail in U.S. Pat. No. 5,687,103, which is hereby incorporated by reference herein.

Through the extension port 110 the main module 90 is capable of sensing when a new slave unit 150:n+1 has been added to the extension port 110 or to the extension port 150:n of a previously connected slave 120:n. According to one embodiment of the present invention the addition of a new slave unit causes the signal level of a sensor line in the extension port to change its value, thereby indicating the presence of a new slave unit.

When the main module 90 has sensed that a new slave has been added, it will deliver an address value on the extension port 110, to be forwarded to the new slave unit 150:n+1. Slave units already provided with addresses will forward the address message to the new slave unit. This is described in detail with reference to FIG. 7.

The Position Measuring Device

Figure 4:
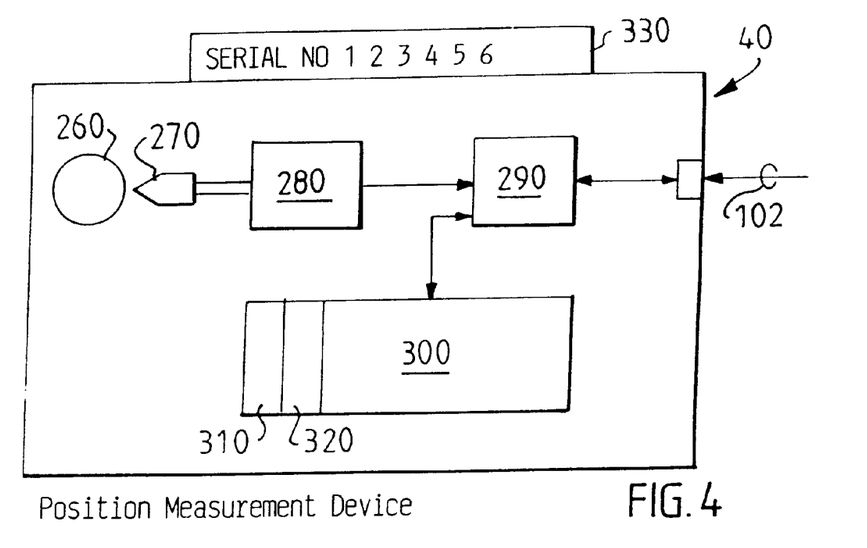
FIG. 4 shows a block diagram of a position measurement device.

FIG. 4 is a block diagram of a position measuring device 40. The position measuring device 40 may be designed as described in incorporated-by-reference U.S. Pat. No. 5,687, 103. The position measuring device 40 may have an encoding disc 260 and a detector 270 for generating an absolute position signal, e.g. a Gray coded signal. A component 280 comprising a parallel/serial converter receives the absolute position signal, and converts it to a stream of data bits suitable for serial transmission via a data bus 102 to the measurement port of a main module 90 or slave unit 120. The component 280 is coupled to a transceiver 290, which transceiver handles the delivery/reception of data messages to/from the data bus 102 (see FIG. 1). In this connection, the data bus 102 may include a timing line for timing pulses used for the serial data communication, as mentioned in U.S. Pat. No. 5,687,103 and explained in detail in European Patent Application No. 0 171 579, which is also hereby incorporated by reference herein.

The transceiver 290 is also coupled to a memory 300 in which parameters of the position measuring device 40 can be stored. A detailed description of such a parameter memory is provided in incorporated-by-reference U.S. Pat. No. 5,687,103. The parameter memory 300 is partitioned into several different regions. A first memory region 310 is provided with parameter information which is specific to that particular position measurement device, such as a serial number for providing unambiguous identification of the measurement device. Additionally the first memory region 310 may contain parameters such as the measurement range provided by the encoding disc/detector combination. According to a preferred embodiment the first memory region 310 is write protected.

The memory 300 may also include a second memory region 320 for customer parameters. This second region is a read/write memory region, thus enabling an operator to provide individual settings in the position measuring device. Such data may be read and/or manipulated by means of the user interface 192, described in connection with FIG. 1 above.

The position measuring device 40 is also provided with an externally visible tag 330 provided with information identifying the individual device 40. This identity information corresponds to at least some of the parameter information stored in the first memory region 310. The tag 330 enables an operator to visually establish the identity of the encoder connected to a certain movable part e.g. 30:1. Using the above described interface 192 the operator is capable of viewing the contents of the data base 190 (see FIG. 2) so as to ensure correct concordance between individual actuators 30A, 30:1, 30:2 and corresponding measuring devices 40:A, 40:1, 40:2.

The Slave Unit

Figure 5:
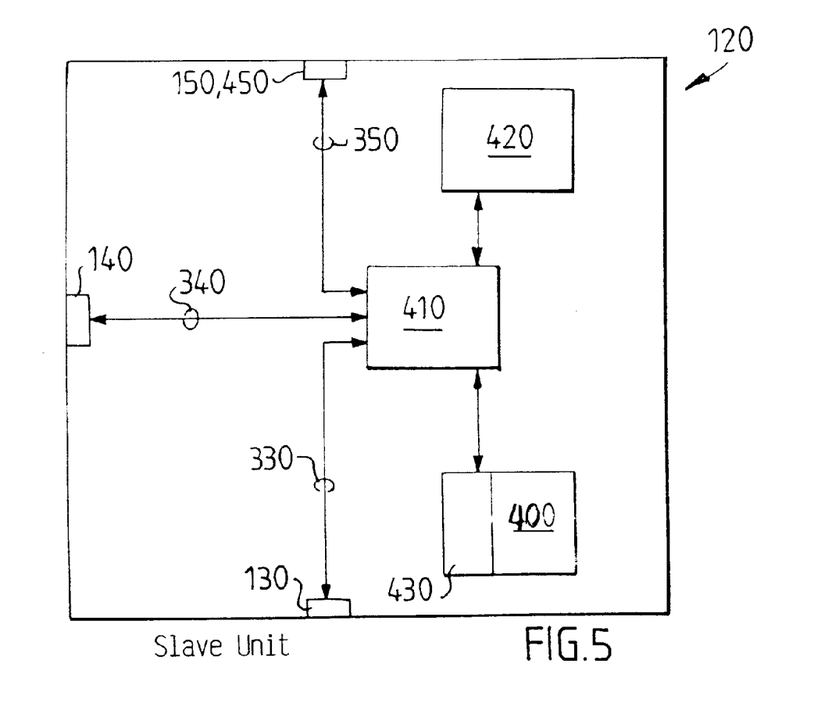
FIG. 5 shows a block diagram of a slave unit 120.

FIG. 5 is a block diagram of a slave unit 120. The slave unit comprises a nonvolatile memory 400, a microprocessor 410 and a read/write memory 420. The non-volatile memory 400 has a first memory portion 430 wherein a computer program is stored for controlling the functions of the slave unit 120. The processor 410 is coupled to the ports 130, 140 and 150, respectively, via buses 330, 340 and 350 respectively.

The measurement port 140 of a slave unit 120 is arranged in the same way as the above described measurement port 100. Hence, data can be communicated bi-directionally in a serial manner between a position measurement device 40 via the measurement port 140.

The communications port 130 is adapted for connection, via a bus 440, to an extension port 110 or 150.

The extension port 150 has the same physical constitution as the extension port 110 of the gateway main module. Similarly the communications port 130 of all the slave units have the same physical constitution. A standardized cable 440:1 with a standardized pre-assembled connector 460 can therefore be used for connecting a first slave 120:1 to a mating connector 450 of the extension port 110 of the main module 90.

An identical standardized cable 440:2 can be used for connecting another slave unit 120:2 to the extension port 150:1 of the first slave unit and so on. The use of a standardized cable 440 (FIG. 1 illustrates examples 440:1, 440:2 and 440:3) with standardized connectors provides the advantageous effect of enabling very fast plug-in of new measurement devices 40 for communication with a master module 50. There is no longer any need to perform the arduous task of connecting one conductor at the time when attaching new measurement devices. Hence, the hardware set-up procedure is substantially simplified, thereby reducing the time duration for attaching new position measuring devices to a position monitoring system as illustrated in FIG. 1. Additionally the time duration for attaching new position measuring devices is further reduced using a simplified software set-up procedure, featuring automatic addressing of a newly added slave unit. This is achieved using the software in the main module co-operating with that of the slave units such that a slave unit that has been added using the hardware set-up procedure is automatically provided with an address to which it should respond. Once it responds to its address, the main module 90 will poll it for information about the position measurement device 40 connected to its measurement port 140. In this manner the time duration for set-up is greatly reduced, and reliability of the total system is improved, since the risk for erroneous connections of conductors is eliminated and the data communication is immediately enabled without the need for any operator to set addresses etc. The software set-up procedure is described in more detail in connection with FIG. 7 below.

The computer program stored in the first memory portion 430 of non-volatile memory 400 is such that when the program runs on a data processing unit of a slave unit connected to a signal handling device 90, program causes the slave unit 120, to cooperate with the computer program running on the data processing unit of the main module.

Figure 6:
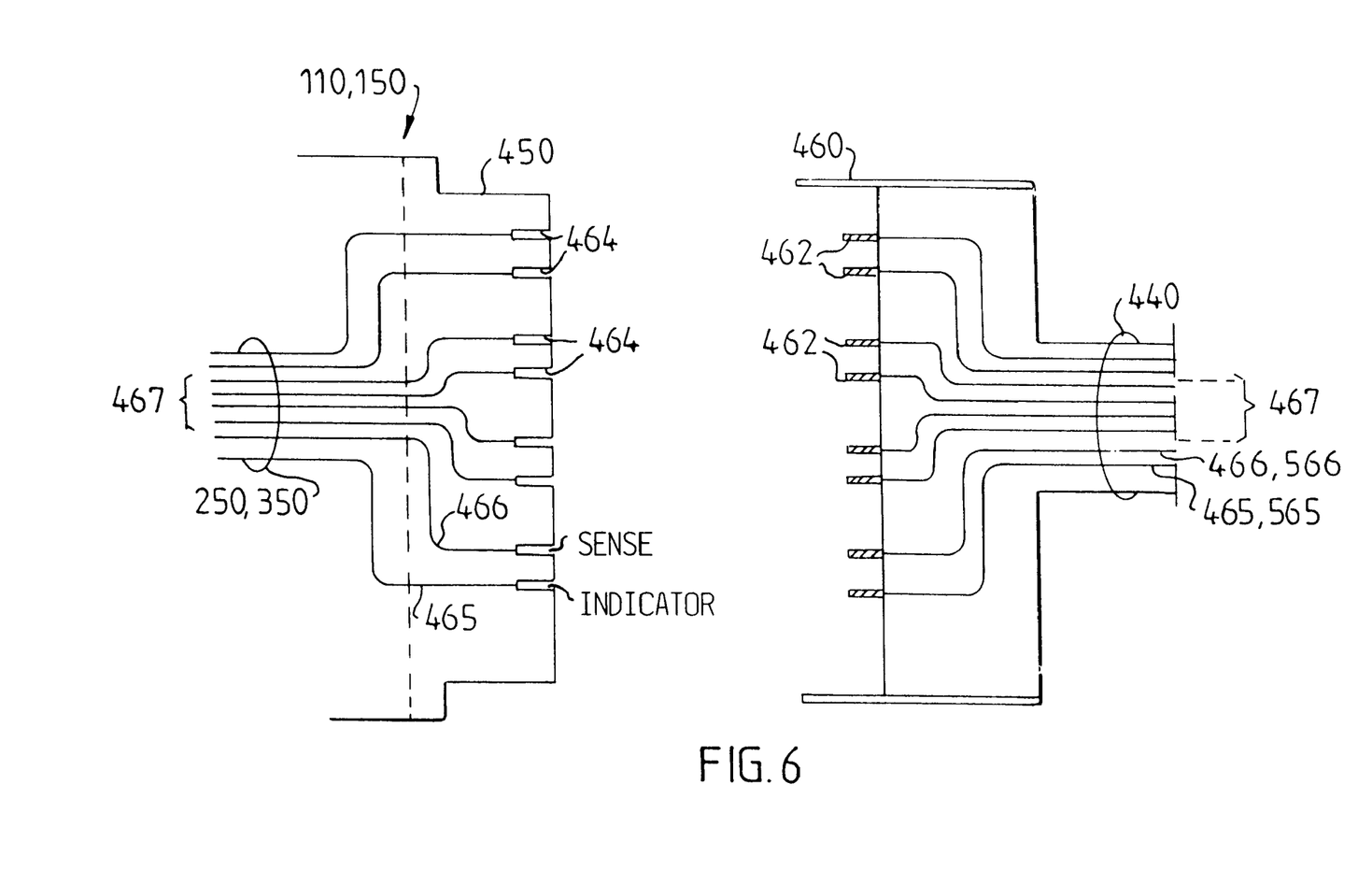
FIG. 6 shows a schematic side view of a physical embodiment of a pair of preassembled mating connectors suitable for hooking up a slave unit to an extension port.

FIG. 6 is a schematic sectional side view of a physical embodiment of a pair of pre-assembled mating connectors suitable for hooking up a slave unit with an extension port. With reference to FIG. 6 in conjunction with FIG. 1 the extension port I 10 or 150 has a pre-assembled connector 450 adapted for mating with a connector 460 coupled to a slave unit via a bus 440. The buses 440:1, 440:2 and 440:3 shown in FIG. 1 can be of the type shown in FIG. 6, according to an embodiment of the present invention. Although the illustration shows male contact pins 462 on connector 460 and female contact receptacles 464 in connector 450, it is readily understood that it could be made in the opposite manner, or by a combination of male and female contacts on each connector.

The connector 450 has eight conductor contacts according to the embodiment shown in FIG. 6. A first conductor 465 (FIG. 6) provides an indicator signal having a high or a low signal level under the control of the main module processor 210. A second conductor 466 is a sensing line enabling the main module to receive a signal having a high or a low signal level from the slave unit(s) connected to the extension port 110.

A plurality of other conductors 467 are used for bidirectional data traffic between the main module 90 and the slave units 120. According to an embodiment, the bus 440 and the internal buses 330 and 350 in the slave units are such that the data lines 467 are directly connected from the communications port 130 of a slave unit to its extension port 150, while allowing for the signals to be tapped by the processor 410.

A high level on the sensing line 466 indicates to the main module that there is no new slave attached. If the main module, however, receives a low signal level (TRUE) on the sense line 466, this means that a new slave unit has been plugged in.

Set-up Procedure

Figure 7:
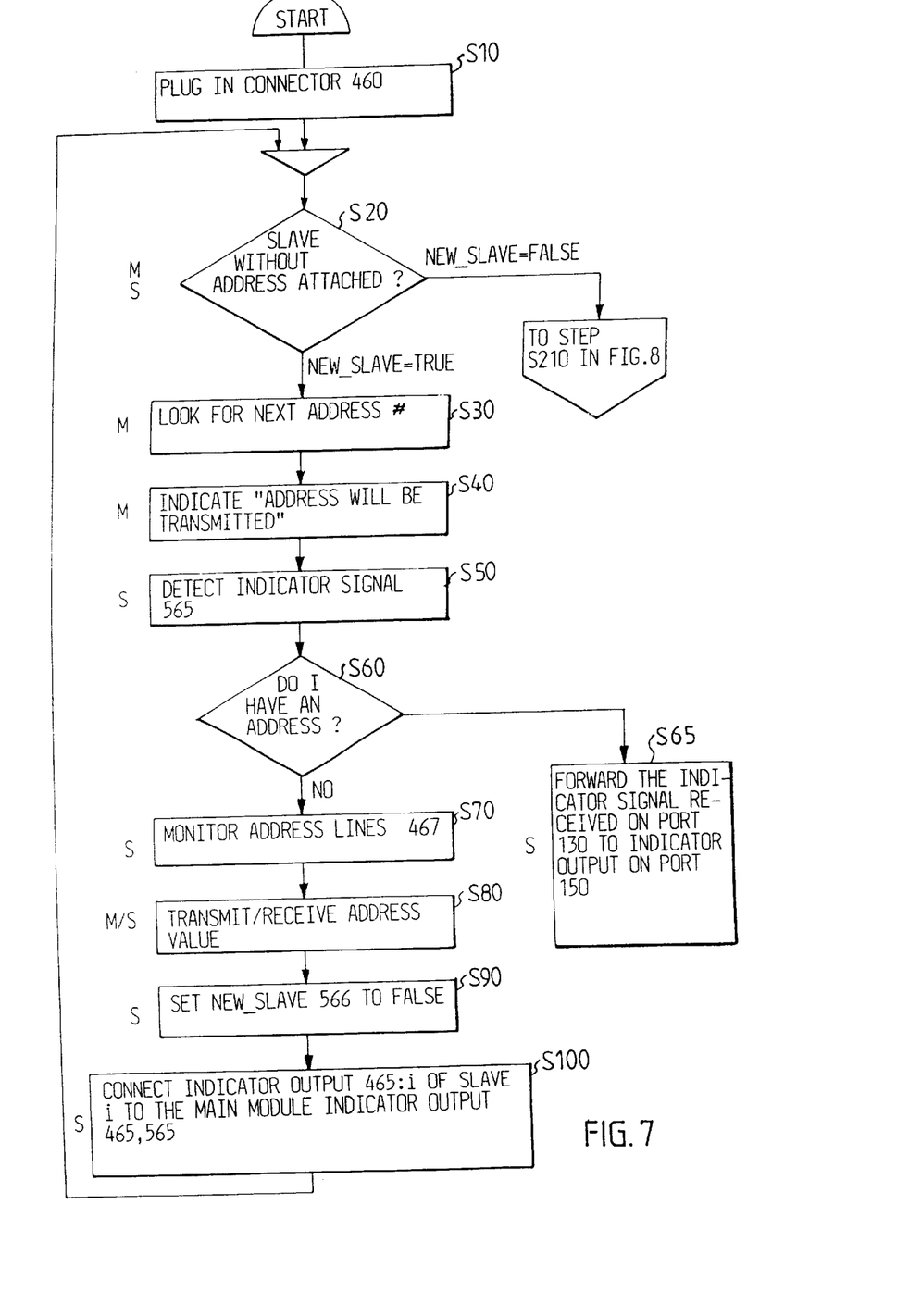
FIG. 7 shows a flow chart illustrating an exemplary embodiment of a procedure for adding a position measuring device 40 to the arrangement 10 shown in FIG. 1.

FIG. 7 is a flow chart illustrating an embodiment of a set-up procedure for an arrangement 10 shown in FIG. 1. Letters "M" and "S", respectively, to the left of the boxes in FIG. 7 indicate whether the relevant step is performed by Main module 90 and/or Slave unit 120. At the start of the set-up procedure there is a main module attached to the bus 70, basically like the main module 90:II which is shown in FIG. 1. In a first step S10 the pre-assembled connector plug 460 of an extension module E1:II is plugged into the mating connector 450 of the main module 90:II. This step is performed by an operator.

The extension module E1:II includes a slave unit 120 which has not yet been provided with any address. Each slave unit 120 generates a status signal for indicating whether it has received an address value to which it should respond when called by the main module 90 connected to it. Since, in this example, the slave unit 120 in extension module E1:II does not yet have any address it delivers a low (=TRUE) status signal level on its NEW_SLAVE output conductor 566 of communications port 130, 460 (see FIG. 6 in conjunction with FIG. 1). Hence, the main module will detect whether a new slave unit has been attached (step S20).

When main module detects a TRUE value on the sensing input 466, indicating the presence of a new slave 120, it will look (step S30) in an address register 580 (FIG. 3) to see how many slaves, if any, have already been connected to it. The address register, which is a portion of the R/W-memory 220 has an address value #1 reserved for the slave unit 120:1. An address value #2 is reserved for slave unit 120:2 and so on. A flag is set for each address # that has been activated. If this is the first slave to be attached, all the flags will have the boolean value FALSE, and therefore the main module will prepare for delivering address value #1.

Thereafter main module 90 will set the indicator signal 465 to a low (TRUE) level so as to indicate to the slave that it should prepare to receive an address value (step S40). Hence, a low level on the indicator signal means that an address will be transmitted on the data lines 467 (FIG. 6) within a predetermined time interval.

A slave module 120:i without any address will always monitor (step S50) the signal level on the indicator input signal line 565, and when such a slave 120:i detects a low (TRUE) level and that slave 120:i does not yet have any address (step S60), it will react by monitoring (step S70) the data lines 467 so as to receive and record the address value.

If the test in step S60 reveals that the slave 120:i already has an address (i.e. the YES-branch of box S60), slave 120:i will enter a transparent mode (step S65). In this mode, it will transparently forward signals and address values between its communications port 130:i and its extension port 150:i until the signal level on its sense input 466:i of extension port 150:i indicates that all connected slaves have received an address. This transparent mode advantageously allows for the same set-up procedure to be used by the main module when an additional slave unit is connected to the outmost of the previously connected slave units. Steps S30, S40, S50, S70, S80 and S90 constitute method steps wherein the main module communicates with a slave unit for providing it with an address. When the new slave unit 120:i is connected to the extension port 150 of a slave unit 120i-1 (which already has received its set-up information) the communication between the main module and slave 120:i will be transparently forwarded by slave unit 120i-1. Thus, the slave has an active set-up mode involving the execution of steps S30, S40, S50, S70, S80 and S90; a transparent set-up mode step S65, and an operational mode with reference to FIG. 8 below.

The main module will send the address value (the lowest address value available indicated by the flags in the register 580), and the slave 120:i will receive the address value (step S80). In this connection, the main module also sets the relevant address flag status to TRUE. For example, when main module sends address value #, it will also set its internal address #1 flag to TRUE so as to be able to keep track of which addresses have been distributed and how many slaves are connected to the main module.

In connection with reception of its address value, a slave will set its NEW_SLAVE status signal to FALSE (=high signal level), and indicate this to the main module on signal line 566 (FIG. 6), as indicated by step S90 in FIG. 7A.

After the reception of its own address value, i.e. after step S80, the slave will connect its indicator input 565:i in its communications port 130:i, 460 to its indicator output 465:i on its extension port 150:i (step S100). In other words, the signal received on indicator input 565:i of communications port 130:i, 460 will be transparently forwarded to the indicator output 465:i of extension port 150:i. In this manner, a slave 120:i which has an address value will transparently forward the indicator signal delivered from the main module to the next slave. Likewise, the slave 120:i which has an address value will transparently forward the signal received from the next slave 120:i+1 on its sense input 466:i on its extension port 150:i to its indicator output 566:i on its port 130:i. Slave 120:i, which has an address value, will also transparently forward the address value, delivered by the main module, from its communications port 130:i to its extension port 150:i so as to supply the address value to the new slave 120:i to the new slave 120:i+1. Prior to receiving its own address, slave i continuously delivers a high signal level on the indicator output 465:i of its extension port 150:i. This enables the next slave 120:i+1, which may be connected to the extension port 150:i of slave number i to receive an address in the same manner. Hence, the software set-up procedure described with reference to steps S20–S100 can be repealed until all slave units have received an address.

After the conclusion of step S100, the procedure will be repeated from step S20.

If another slave unit i+1 without address is connected to the extension port of the slave i which just received its address, this fact will be detected by the slave i, using its sense input 466 and the signal received on the sense input 466 will be forwarded to its communications port 130 for delivery to the main unit (step S20).

If, in step S20, there is not detected any new slave unit the main module will start the data collection procedure, which is described below with reference to FIG. 8.

Data Collection Procedure

Figure 8A:
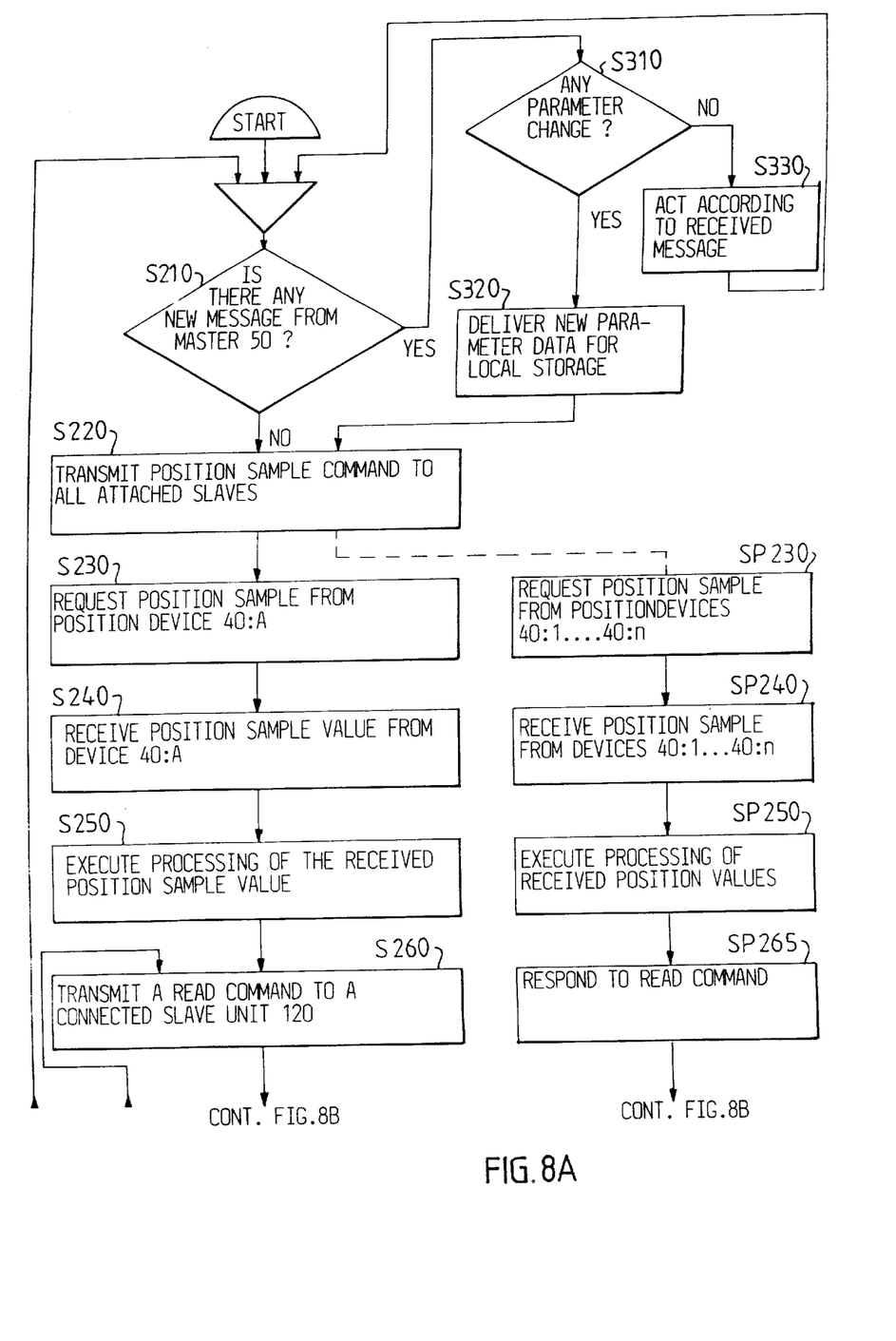
FIG. 8A shows a flow chart illustrating an embodiment of a procedure for collecting data from a plurality of position measuring devices that are connected to a main module.
Figure 8B:
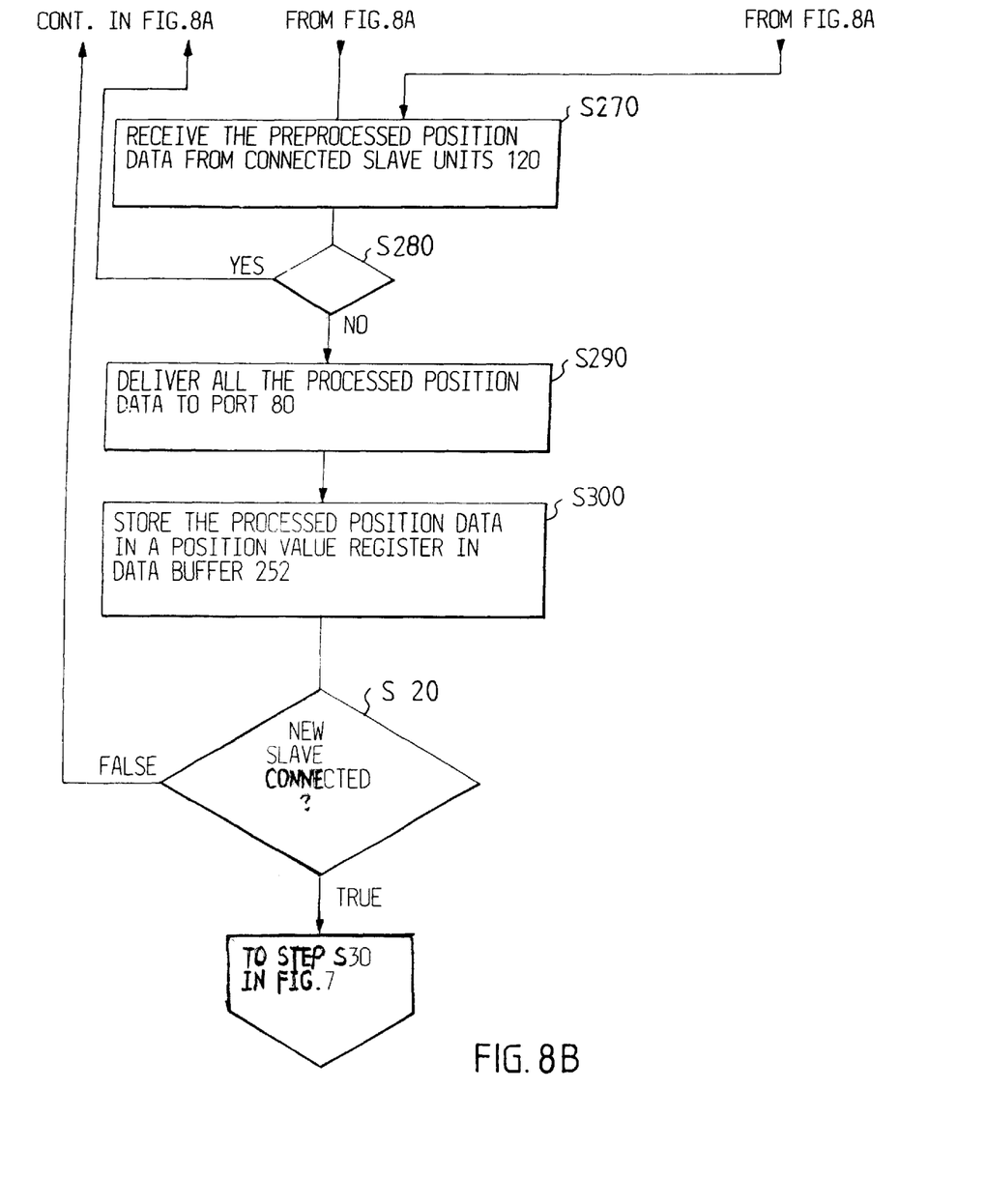
FIG. 8B shows a flow chart illustrating another embodiment of a procedure for collecting data from a plurality of position measuring devices that are connected to a main module.

FIGS. 8A and 8B shows a flow chart illustrating an embodiment of a procedure for collecting data from the position measuring devices 40 that are attached to a main module. The procedure will be described with reference to the arrangement 10 shown in FIG. 1 for the purpose of simplifying the understanding. The data collection procedure is described primarily from the point of view of steps performed by the main module 90.

The data collection procedure is a cyclic procedure, i.e. it is iteratively repeated during normal operation. Once the data collection procedure has been started, the first step S210 is to read any message received from the master. According to one embodiment this is done by the processor 210 (FIG. 3) requesting information from the port 80. The port transceiver 256 polls the input buffer 254 for any messages received from the bus 70, and delivers any received message, via bus 230, to processor 210. If there is no new message in the input buffer 254 the data collection procedure continues with step 220.

In step S220 the processor 210 transmits a position sample command on extension port 110 so as to order all the attached slave modules 120:1, 120:2 . . . 120:n to fetch a position value from their corresponding position measuring devices 40:1, 40:2 . . . 40:n. According to one embodiment this is done using a message with an address to which all slave units react. This advantageously saves some time and contributes to enable a fast and simultaneous response to the position requests from all position measurement devices 40.

Each slave unit 120 reacts immediately on reception of the position sample command by sending a position value request on its measurement port 140 (Step SP230 in FIG. 8A). On reception of the position value request each position measurement device 40 reads the momentary position value and returns the momentary position value via bus 102 to the slave unit 120 that requested it.

The main module processor 210 also sends (see step S230) a position value request on its measurement port 100, so as to get the momentary position value from position measuring device 40:A.

In this manner the requests S230 and S230 by the main module and the slave modules, respectively, are performed substantially as parallel processes. Hence each position measurement device 40A, 40:1 . . . 40:n is made to deliver a position sample value substantially simultaneously. According to one embodiment the return of momentary position values is started from all connected position measurement devices 40A, 40:1 . . . 40:n within a time span of 0 to 100 microseconds from the execution of step S220. According to a preferred embodiment the return of momentary position values is started from all connected position measurement devices 40A, 40:1 . . . 40:n within a time span of 0 to 50 microseconds from the execution of step S220. According to a most preferred embodiment the return of momentary position values is started from all connected position measurement devices 40A, 40:1 . . . 40:n within a time span of 0 to 10 microseconds from the execution of step S220.

On reception of the momentary position value from position measurement device 40A (step S240) the processor 210 operates, in accordance with its program routine 230, to perform some data processing (step S250) of the position value. This processing may include a scaling of the position value in accordance with a pre-set scaling factor. The processed momentary position value is hereinafter referred to as the pre-processed position value. The pre-processed position value is temporarily stored in the read/write memory 220 while awaiting the reception of pre-processed position values from the attached slave units.

In each slave unit the respective processor 410 is also performing data processing (step SP250 in FIG. 8A) of the position value so as to generate a preprocessed position value. The pre-processed position value is temporarily stored in a the read/write memory 420 (see FIG. 5) while awaiting the moment to transmit it to the main module. Since each position value is processed locally in its own slave unit, there is provided a significant relief as regards data processing load on the master and/or main module, thereby advantageously rendering faster overall data processing, i.e. improved performance.

At a predetermined time after the transmittal of the position sample command S220 the processor 210 of main module 90 starts requesting the slave units to deliver their respective pre-processed position values (step S260). According to an embodiment the main module sends a "read position command" consecutively to the individual slave units, attached via extension port 110, starting with the lowest address.

After reception of the "read position command" each slave unit responds (step SP265, FIG. 8A) by transmitting its pre-processed position value.

The main module 90 awaits reception (step S270, FIG. 8B) of the preprocessed position value from the first asked slave and, after reception thereof, the main module 90 checks (step S280) if there is still a pre-processed position value to obtain. If there is another value to obtain the steps 260 and 270 are repeated.

In that manner all the pre-processed position values are collected by the main module and sorted in accordance with a predetermined specification. All the pre-processed position values are delivered (S290) to the intelligent port 80 such that it enables the master 50 to reach all these values with a single position request command, as illustrated by step S300 in FIG. 8B. According to one embodiment the processor 210 creates a list; and the data relating to position measurement device 40A is placed first in a list, data relating to position measurement device 40:1 is placed second in the list, data relating to position measurement device 40:2 is placed thereafter in the list and so on. In this manner the data is arranged so as to conform with the input data form according to the first communications protocol for communication from the main module 90 to the master 50 via bus 70. The processor delivers the list to port 80 in step S300, and thereafter it starts the cyclic data collection procedure by performing step S210 again (unless a new slave unit has been connected, in which case steps S20 and S30 are executed, according to an embodiment of the present invention). According to one embodiment processor 210 adds a time tag indicating the time of position polling for the position values in the list. The time tag is generated in dependence on the time of execution of step S220 or step S230 described above. In this embodiment the main module has a clock function the time of which is synchronized with the time in master 50.

After reception of pre-processed position values from processor 210 the port 80 stores the pre-processed position values in the output buffer 252 such that the values are ready for delivery in accordance with the third communications protocol, whenever a request is received from the master 50. Since the port 80 is an intelligent unit capable by itself of communicating with the master 50, the processor 210 is enabled to continue with its tasks, as defined by the program routine in memory portion 230. Since the data collection is cyclic and repeated with a certain frequency there will always be a fresh set of position values available for collection in the output buffer 252 of port 80. In this manner the master is ensured to get a very quick answer containing the latest update of the pre-processed position values. The transceiver unit 256 has an address to which it responds when called by the master. In this manner the transceiver, upon reception of a position request message from the master 50, is capable of delivering the pre-processed position values relating to all connected position measuring devices 40:A, 40:1 . . . 40:n in a single response frame.

The fact that the master can obtain all the position values in response to a single request on the bus 70 leads to an advantageously quick performance of the total position monitoring system 10 shown in FIG. 1. More particularly the feature that the master reaches a plurality of position values via a single address on bus 70 leads to a reduction of the amount of data exchange necessary on the bus 70.

Whereas there may exist a position monitoring system having a master for communicating with a plurality of position measuring devices; the master according to the prior art has to address each position measuring device individually, rendering a lot of overhead bytes of data transmission on the bus 70 and thereby also a significant reduction of available bandwidth when one more position measuring device is added to the system. Additionally this prior art position monitoring system will get position values collected at different points in time, since it has to sends individual requests, which is disadvantageous for some control applications.

Referring again to FIG. 8, the data collection cycle is normally repeated by performing step S210 after the execution of step S300. According to one embodiment of the present invention the data collection process has a maximum cycle duration time of 10 milliseconds when it is not interrupted by the addition of new slave units. This means that a fresh set of mutually simultaneous position values will be delivered to the port 80 every 10 ms. According to a preferred embodiment the cycle duration time is less than one millisecond, such that an up-dated set of position values is provided more than 1000 times per second.

In step S210 the processor requests port 80 for any new message. In response thereto the port transceiver 256 polls the input buffer 254 for any messages received from the bus 70, i.e. from the master 50. If there is a new message, it will be delivered to processor 210. According to one embodiment there is first a check (step S310, FIG. 8A) to see whether the message includes any changes to parameter values or pre-setting data relating to any of the position measurement devices. If the message includes such a parameter/data changes, the processor 210 transmits (Step S320) the relevant data, via port 100 and/or port 110, to the relevant measurement devices for storage in the memory region 320 for customer parameters, as described above (FIG. 4). According to one embodiment the parameters are stored in the R/W-memory 420 of the slave unit corresponding to the relevant measurement device 40, and in R/W-memory 220 of the main module when the parameter data relates to measurement device 40A such that it is readily available for use in the pre-processing step S250, described above. The parameter data may contain information relating to the movable parts 20 or the actuators 30 (FIG. 1); information which has been entered by an operator via the operator interface 192.

Figure 9:
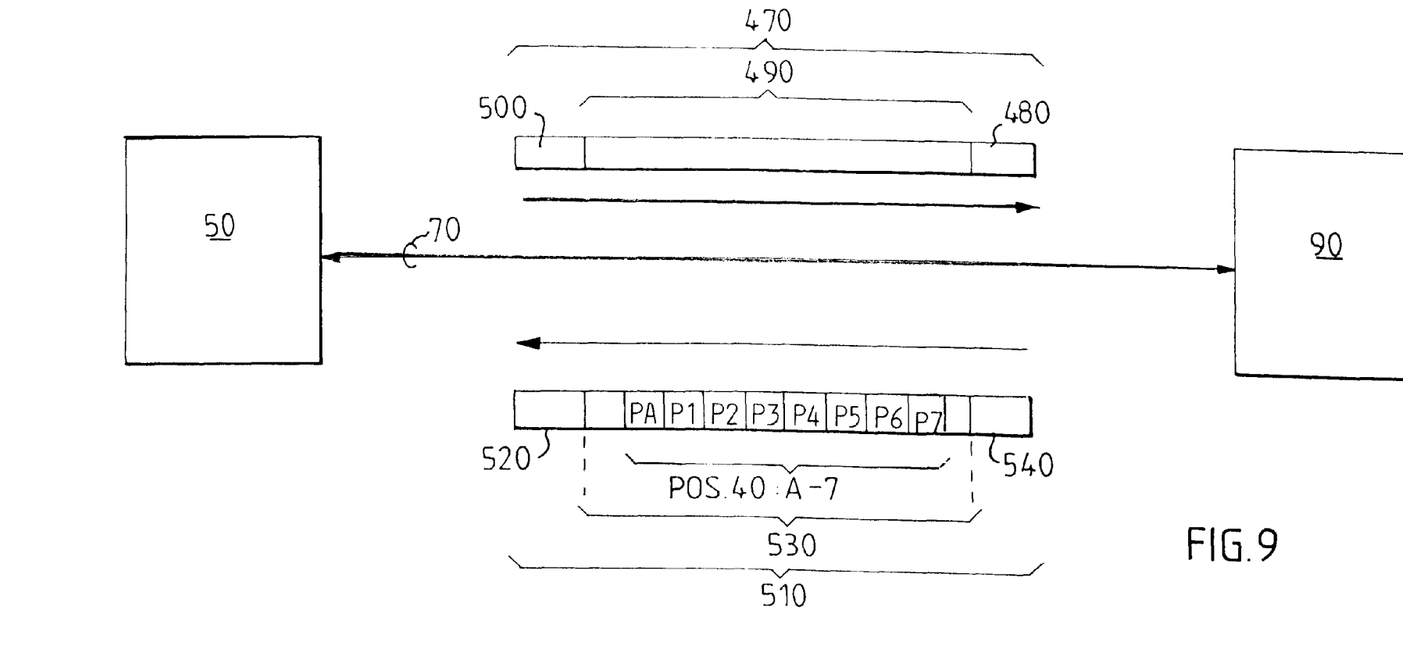
FIG. 9 shows an exemplary embodiment of the message structure for messages on the bus 70 between the master 50 and the main module 90.

FIG. 9 illustrates an embodiment of the message structure for messages on the bus 70 between the master 50 and the main module 90. The frame 470 illustrated above the bus 70 in FIG. 9 is a frame traveling in the direction from the master 50 to the main module 90. It has a header 480 including the address to main module 901, a data portion 490 and a trailer portion 500. According to one embodiment of the invention the data portion 490 has a settable length. The number of octets in the data portion 490 is settable between 8 and 244. When a parameter change command (see step S310 above) is transmitted by the master, the parameters for the individual position measurement devices are distinguished by predetermined positions within the data portion 490.

The message frame 510 shown below bus 70 in FIG. 9 illustrates an embodiment of a response frame traveling in the direction from the main module 90 to the master 50. The illustrated response frame is a response including the position values discussed in connection with step S290 and step S300 above. The frame has a header 520 which may include the address to master 50, a data portion 530 and a trailer portion 540. The position values for the position measurement devices 40:A, 40:1–40:7 are placed in consecutive order within the data portion 530.

If the check step S310 reveals that the message from master 50 did not relate to a delivery of new parameter values, the message may include other instructions from the master 50 to the main module 90, in which case step S310 is followed by step S330. According to one embodiment this means that main module 90 will perform the actions requested by the master before continuing with steps S220–S300 of the data collection cycle. According to another embodiment the main module will perform the requested actions virtually in parallel with the data collection cycle. This may be achieved by time sharing in processor 210 between the two virtually parallel processes. The instruction from master 50 may, for example include a request for diagnostics from a selected one of the position measurement devices 40:A, 40:1–40:n. In response to a diagnostic request the processor 210 of main module 90 will send a diagnostic request the relevant measurement device (s) and, upon response from the relevant measurement device(s) a response frame containing the requested information will be transmitted on the bus 70 with destination to the master 50.

According to one embodiment, the message from the master in step S210 may be to instruct the main module to deliver parameter information relating to newly added, or specified, position measurement devices. This requested parameter information may include e.g. the serial number form memory region 310 (FIG. 4) of the relevant measurement device(s). In this manner, an operator can cause the main module to deliver parameter information from a selected position measurement device so as to enable the operator to compare the information provided by the main module with the serial number on the tag 330 (FIG. 4) of the relevant measurement device. This advantageously enables an operator to establish the identity of the measurement device, as mentioned above in connection with the description of FIGS. 4, 5 and 7. According to one embodiment, the main module always polls a newly connected slave unit for such parameter information as soon as the newly attached slave, or slaves, have been provided with addresses to which it, or they, respond. This feature also provides the advantage of enabling the operator to make sure that the set-up data in the master, as delivered by the main module(s) 90, corresponds to the actual hardware configuration of the position monitoring system.

What is claimed is:

1. A signal handling device for enabling a data transmission between a plurality of position measuring devices and a master unit, the signal handling device comprising:

a main communications port for communicating with the master unit via a data bus;

a measurement port for communicating with a position measuring device of the plurality of position measuring devices;

an extension port for connecting to an intelligent slave unit to enable a communication with further position measuring devices of the plurality of position measuring devices via the slave unit; and a data processing unit capable of managing data traffic between the main communications port, the measurement port and the extension port, wherein a plurality of actuators are coupled to the master unit and the master unit provides control signals to the actuators in dependence on measurement signals of the position measuring devices provided to the master unit by the signal handling device.

2. The signal handling device according to claim 1, wherein the data processing unit is connected to the position measuring device, the data processing unit requesting a first position value from the position measuring device and transmitting a command to the extension port, the command causing the slave unit to request at least one second position value from one of the further position measuring devices.

3. The signal handling device according to claim 2, wherein the first position value and the at least one second position value are collected from the position measuring device and the further position measuring devices within a time period from a transmission of the command, the time period ranging between 0 and 100 microseconds.

4. The signal handling device according to claim 2, wherein the data processing unit includes a processor and an input arrangement, the processor performing one of mathematical operations and logical operations on the first position value to determine a first pre-processed position value, the first position value being received by the measurement port, the input arrangement receiving a second pre-processed position value from the extension port, the second pre-processed position value being determined as a function of the at least one second position value, the first and second pre-processed position values being arranged and received by the main communications port to be deliverable in a single message via the data bus.

5. The signal handling device according to claim 1, wherein the extension port includes a pre-assembled connector for enabling a releasable plug-in connection of the slave unit.

6. An intelligent slave unit for enabling a data transmission between a plurality of position measuring devices and a signal handling device, comprising:

a slave communications port for coupling to an extension port of the signal handling device;

a measurement port for communicating with a position measuring device of the plurality of position measuring devices;

an extension port for connecting a further intelligent slave unit, the extension port enabling a communication with further position measuring devices of the plurality of position measuring devices via the further intelligent slave unit; and a slave data processing unit capable of managing data traffic between the slave communications port, the measurement port and the extension port.

7. The intelligent slave unit according to claim 6, wherein the slave data processing unit transmits a position value request to the measurement port in response to a measurement command from a main module of the signal handling device, the measurement command being received by the slave communications port.

8. The intelligent slave unit according to claim 6, wherein the slave data processing unit includes at least one processor performing one of mathematical operations and logical operations on a position value to determine a pre-processed position value, the position value being received by the slave measurement port, the at least one processor transmitting the pre-processed position value over the slave communications port in response to a transmission request from a main module of the signal handling device.

9. The intelligent slave unit according to claim 6, wherein the extension port includes a pre-assembled connector for enabling a releasable plug-in connection of the further slave unit.

10. A position monitoring system, comprising:

a plurality of position measuring devices determining a position of movable actuators to form position information;

a master unit for receiving the position information;

a signal handling device including a main communications port communicating with the master unit, a measurement port communicating with the plurality of position measuring devices, an extension port and a data processing unit managing data traffic between the main communications port, the measurement port and the extension port; and a slave unit connected to the extension port; wherein
        the slave unit includes a slave communications port, a slave measurement port, a slave extension port and a slave data processing unit, the slave data processing unit managing a slave data traffic between the slave communications port, the slave measurement port and the slave extension port.

11. A method for enabling a data transmission between a plurality of position measuring devices and a master unit using a signal handling device, the method comprising the steps of:

communicating with the master unit via a data bus coupled to a communications port of the signal handling device;

communicating with a first one of the plurality of position measuring devices via a measurement port of the signal handling device;

providing from the master unit control signals to a plurality actuators in dependence on measurement signals of said position measuring devices;

enabling a communication with further ones of the plurality of position measuring devices via an extension port of the signal handling device; and managing data traffic between the communications port, the measurement port and the extension port to communicate a plurality of position values via the data bus in a single message.

12. The method according to claim 11, wherein the managing step includes the following substeps:

performing one of mathematical operations and logical operations on one of the plurality of position values received by the measurement port to determine a first pre-processed position value, receiving a second pre-processed position value in a predetermined manner, arranging the first and second pre-processed position values in a further predetermined manner, and providing the first and second pre-processed position values to the communications port to communicate the first and second pre-processed position values to the master unit in the single message.

* * * * *

UNITED STATES PATENT AND TRADEMARK OFFICE
CERTIFICATE OF CORRECTION

PATENT NO. : 6,421,628 B1
DATED : July 16, 2002
INVENTOR(S) : Ulf Thorsander and Peter Fuchs It is certified that error appears in the above-identified patent and that said Letters Patent is hereby corrected as shown below:

Title page,
Item [73], Assignees, should read -- Dr. Johannes Heidenhain GmbH, Traunreut (DE), and Leine & Linde AB, Strängnäs (SE) --.
Item [57], ABSTRACT,
Line 9, delete "said".

Signed and Sealed this

Twenty-seventh Day of January, 2004

JON W. DUDAS
*Acting Director of the United States Patent and Trademark Office*